US010351237B2

(12) United States Patent
Baruch

(10) Patent No.: US 10,351,237 B2
(45) Date of Patent: Jul. 16, 2019

(54) SYSTEMS AND METHODS FOR UTILIZING UNMANNED AERIAL VEHICLES TO MONITOR HAZARDS FOR USERS

(71) Applicant: QUALCOMM Incorporated, San Diego, CA (US)

(72) Inventor: Doron Baruch, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 15/221,711

(22) Filed: Jul. 28, 2016

(65) Prior Publication Data

US 2018/0029706 A1 Feb. 1, 2018

(51) Int. Cl.
| | | |
|---|---|---|
| *B64C 39/02* | (2006.01) | |
| *H04W 76/14* | (2018.01) | |
| *G05D 1/10* | (2006.01) | |
| *G08B 7/06* | (2006.01) | |
| *H04L 29/08* | (2006.01) | |

(52) U.S. Cl.
CPC .......... *B64C 39/024* (2013.01); *G05D 1/101* (2013.01); *G08B 7/06* (2013.01); *H04L 67/26* (2013.01); *H04W 76/14* (2018.02); *B64C 39/02* (2013.01); *B64C 2201/027* (2013.01); *B64C 2201/12* (2013.01)

(58) Field of Classification Search
CPC .............. B64C 39/024; B64C 2201/12; B64C 2201/027; H04L 67/26; H04W 76/023; G05D 1/101; G08B 7/06
See application file for complete search history.

(56) References Cited

U.S. PATENT DOCUMENTS

| | | | |
|---|---|---|---|
| 9,056,676 B1 | 6/2015 | Wang | |
| 9,665,098 B1 | 5/2017 | Lema et al. | |
| 2010/0256909 A1 | 10/2010 | Duggan et al. | |
| 2010/0332136 A1* | 12/2010 | Duggan | G08G 5/0069 |
| | | | 701/301 |
| 2012/0316769 A1* | 12/2012 | Gagliardi | G08G 3/02 |
| | | | 701/300 |
| 2015/0134143 A1 | 5/2015 | Willenborg | |
| 2016/0059962 A1 | 3/2016 | Abuelsaad et al. | |
| 2016/0101856 A1 | 4/2016 | Kohstall | |
| 2016/0325835 A1* | 11/2016 | Abuelsaad | G08G 1/096716 |
| 2017/0148328 A1 | 5/2017 | Chan et al. | |
| 2017/0336805 A1 | 11/2017 | Luo et al. | |

FOREIGN PATENT DOCUMENTS

| | | |
|---|---|---|
| WO | 2014080388 A2 | 5/2014 |
| WO | 2015179797 A1 | 11/2015 |
| WO | 2016029169 A1 | 2/2016 |

OTHER PUBLICATIONS

International Search Report and Written Opinion—PCT/US2017/033794—ISA/EPO—dated Sep. 1, 2017.

* cited by examiner

*Primary Examiner* — Rodney A Butler
(74) *Attorney, Agent, or Firm* — The Marbury Law Group, PLLC

(57) ABSTRACT

Various methods for utilizing an unmanned aerial vehicle (UAV) to monitor hazards for a user may include maintaining the UAV at a monitoring position relative to the user, monitoring an area surrounding the user for approaching objects, detecting an approaching object, determining whether the approaching object poses a danger to the user, and performing one or more actions to mitigate the danger of the approaching object in response to determining that the approaching object poses a danger to the user.

41 Claims, 8 Drawing Sheets

SYSTEMS AND METHODS FOR UTILIZING UNMANNED AERIAL VEHICLES TO MONITOR HAZARDS FOR USERS

BACKGROUND

Accidents between vehicles and pedestrians and bikers are common. Such accidents may be caused by poor visibility, weather conditions, inattention by the driver and/or pedestrian, blind spots, and other reasons drivers do not see a pedestrian and vice versa. Such accidents typically cause serious injury or death to the pedestrian or biker. Injuries may be especially severe for young children, the elderly, and the handicapped.

Solutions for preventing vehicle/pedestrian accidents normally focus on the vehicle. For example, signs or other safety measures may be placed on the road to draw a driver's attention to dangerous areas. Vehicles may also be designed to sense the environment around the vehicle and warn drivers of hazards. Some recent model high-end cars include sensors that can detect pedestrians/bikers and automatically apply the brakes. However, safety solutions are generally not directed to pedestrians and bikers.

SUMMARY

Various embodiments include methods for utilizing an unmanned aerial vehicle (UAV) to monitor hazards for a user. Various embodiments may include a UAV maintaining the UAV at a monitoring position relative to the user, monitoring an area surrounding the user for approaching objects, detecting an approaching object, determining whether the approaching object poses a danger to the user, and performing one or more actions to mitigate the danger of the approaching object in response to determining that the approaching object poses a danger to the user.

In some embodiments, maintaining the UAV at a monitoring position relative to the user may include determining one or more attributes of the user, and determining the monitoring position based on the one or more attributes of the user. In some embodiments, determining one or more attributes of the user may include determining at least one of a position, a velocity, and a height of the user. Some embodiments may further include determining one or more attributes of one or more additional people with the user, in which determining the monitoring position may be further based on the one or more attributes of the one or more additional people. Some embodiments may further include determining one or more environmental conditions, in which determining the monitoring position may be further based on the one or more environmental conditions. In some embodiments, determining the one or more environmental conditions may include determining at least one of a height of one or more stationary objects surrounding the user, a lighting condition, a weather condition, and a current time.

In some embodiments, monitoring the area surrounding the user for approaching objects may include estimating a travel path for the user, determining an area to scan based on the estimated travel path for the user, scanning the determined area to detect objects, estimating a travel path for a detected object, and determining whether the estimated travel path of the user intersects the estimated travel path of the detected object by at least a predetermined probability. In some embodiments, estimating the travel path of the user may include estimating the travel path of the user based on at least a position and a velocity of the user, and estimating the travel path of the detected object may include estimating the travel path of the detected object based on at least a position and a velocity of the detected object. In some embodiments, the predetermined probability may be specified by the user. In some embodiments, the estimated travel path of the user and the estimated travel path of the detected object may be estimated over a specified time frame. In some embodiments, determining the area to scan may include determining an area within a distance from all points of the estimated travel path of the user. In some embodiments, the distance may be specified by the user.

In some embodiments, determining the area to scan may further include determining at least one of a specified radius surrounding the user and an area within a distance from all points of a prior travel path of the user. Some embodiments may further include determining a probability of accuracy of each of the estimated travel path of the user and the estimated travel path of the detected object. In some embodiments, scanning the determined area to detect objects may include communicating with one or more objects through device-to-device or cellular communications.

In some embodiments, determining whether the approaching object poses a danger to the user may include determining one or more attributes for the approaching object, comparing the one or more attributes to one or more thresholds, determining whether the one or more attributes of the approaching object exceeds at least one of the one or more thresholds, and determining that the approaching object poses a danger to the user in response to determining that the one or more attributes of the approaching object exceeds at least one of the one or more thresholds. In some embodiments, the one or more attributes may include one or more of a position of the approaching object, a velocity of the approaching object, a size of the approaching object, a type of the approaching object, and a hazardous characteristic of the approaching object. In some embodiments, the one or more thresholds may be specified by the user. In some embodiments, the one or more attributes may be obtained through device-to-device or cellular communications with the approaching object.

In some embodiments, performing one or more actions may include at least one of generating a visual warning, sounding an audio warning, sending a warning to the approaching object, sending a warning to a wireless communication device carried by the user, escorting the user past the danger, blocking a travel path of the user, and blocking a travel path of the approaching object. Some embodiments may further include determining whether the approaching object still poses a danger to the user, and continuing the one or more actions in response to determining that the approaching object still poses a danger to the user. In some embodiments, determining whether the approaching object still poses a danger to the user may include at least one of estimating a travel path of the user and a travel path of the approaching object, and comparing a one or more attributes of the approaching object to a one or more thresholds.

Further embodiments include a UAV including a processor configured with processor-executable instructions to perform operations of the methods summarized above. Further embodiments include a non-transitory processor-readable storage medium having stored thereon processor-executable software instructions configured to cause a processor of a UAV to perform operations of the methods summarized above. Further embodiments include a UAV that includes means for performing functions of the operations of the methods summarized above.

BRIEF DESCRIPTION OF THE DRAWINGS

The accompanying drawings, which are incorporated herein and constitute part of this specification, illustrate

DETAILED DESCRIPTION

Figure 1:
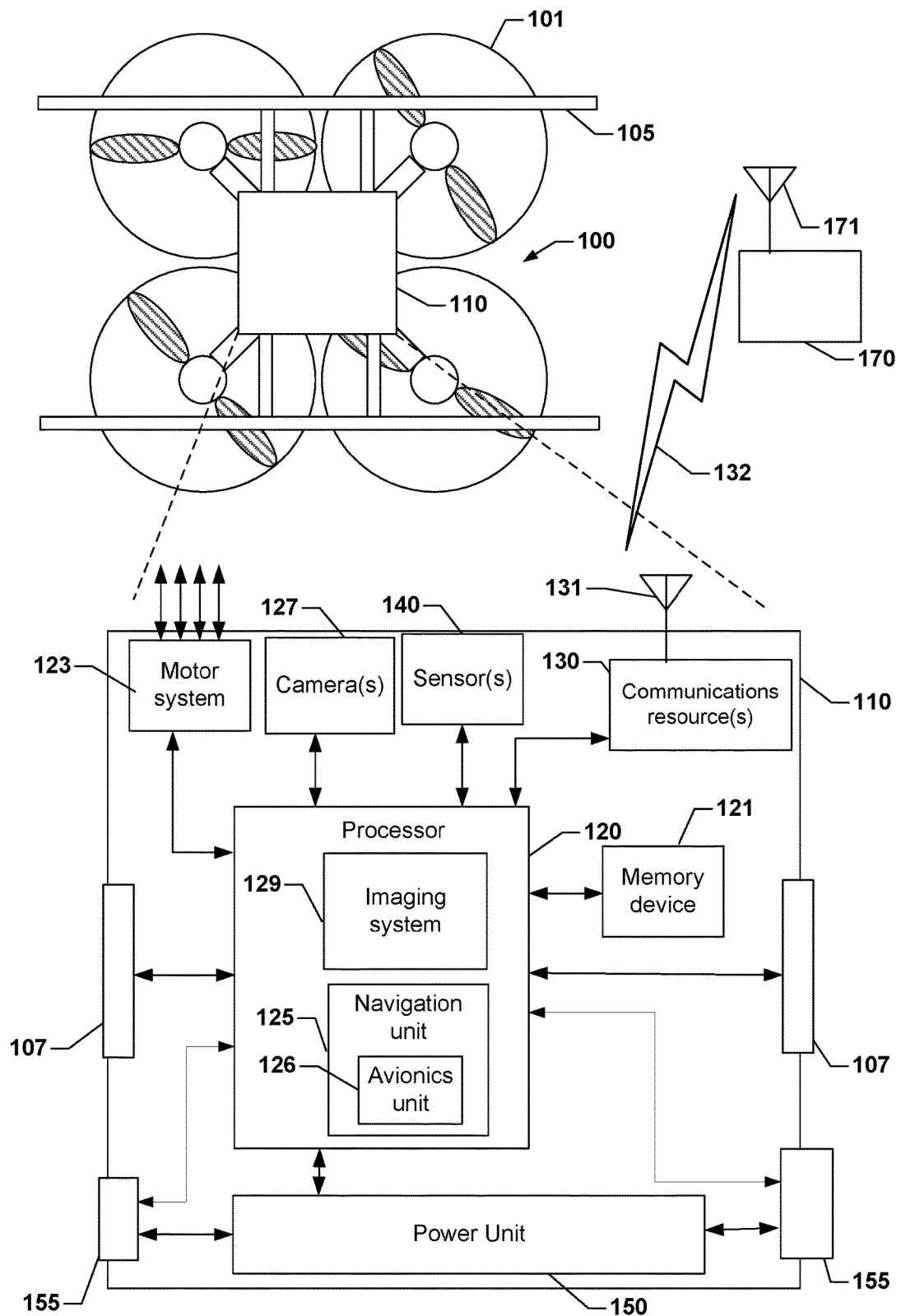
FIG. 1 is a block diagram illustrating components of a typical unmanned aerial vehicle (UAV) system suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Aerial vehicles, such as unmanned aerial vehicles (UAVs), can be used for performing surveillance, reconnaissance, and exploration tasks for military and civilian applications. Such aerial vehicles may carry a payload configured to perform a specific function, such as personal photography and videography. In addition, UAVs may be configured to track and follow a user (e.g., a "follow-me" mode). However, UAVs have not been applied to pedestrian safety applications.

Various systems and methods described herein provide UAVs that are configured to stay near a user (e.g., a pedestrian, jogger, biker, etc.) as the user travels (e.g., on a street or in other open areas) and monitor for potential dangers to the user that the user is approaching and/or are approaching the user. For example, a UAV may monitor stationary objects and structures in an area surrounding the user to assess whether such objects or structures pose a potential danger. As another example, a UAV may monitor moving objects, such as automobiles, to assess whether such objects are traveling towards the user or will intersect with the user's movements and pose a potential danger to the user. For ease of reference, the term "approaching object" is used in the descriptions and the claims to refer to objects that are being approached by a user (i.e., the user is traveling toward the object), objects that are traveling towards the user (i.e., objects moving towards the user), and to objects that are approaching the user due to the combined motions of the user and the object.

A UAV, or multiple UAVs working in concert, may determine a monitoring position relative to a user and perhaps additional people traveling with the user. The monitoring position may be determined based on the position, velocity, and height of the user, and various environmental conditions (the height of surrounding objects like bushes, and current lighting and weather conditions). For example, the UAV may position itself 2-3 meters (or other distance) in front of the user and 1-2 meters (or other distance) above the user.

The UAV may utilize various sensors, cameras, image processing and pattern recognition applications, tracking algorithms, and Global Positioning System (GPS) and navigation systems to scan an area surrounding the user for objects and determine whether those objects pose any danger to the user. For example, the UAV may detect an approaching vehicle that is likely to intersect with the user's estimated travel path at a future time. The UAV may sense the vehicle's velocity, position, size, and/or current traffic light conditions to determine that the vehicle may pose a danger to the user. The UAV may also communicate with the vehicle's electronic system to obtain information from the vehicle using device-to-device communication and/or cellular communication.

The UAV may perform one or more actions to mitigate the danger posed by the approaching object in response to determining that the approaching object does pose a threat to the user. Such actions may include giving an audio or visual warning to the user, blocking the travel path of the user, escorting the user past the danger, sending a warning to a mobile device carried by the user, and/or communicate a warning to the approaching object (e.g., sending a warning to a motor vehicle's electronic system). The UAV may continue to perform the action(s) until the danger has passed (e.g., the vehicle passes by or stops for the user). The UAV may continue to monitor for dangers as the user travels. The user may also set various parameters on the UAV to customize the various types, imminence, and severity of detected dangers that may trigger mitigating actions.

The terms Global Positioning System (GPS) and Global Navigation Satellite System (GNSS) are used interchangeably herein to refer to any of a variety of satellite-aided navigation systems, such as GPS deployed by the United States, GLObal NAvigation Satellite System (GLONASS) used by the Russian military, and Galileo for civilian use in the European Union, as well as terrestrial communication systems that augment satellite-based navigation signals or provide independent navigation information.

FIG. 1 illustrates an example UAV 100 for use with various embodiments disclosed herein. The UAV 100 is a "quad copter" having four horizontally configured rotary lift propellers, or rotors 101 and motors fixed to a frame 105. The frame 105 may support a control unit 110, landing skids and the propulsion motors, power source (power unit 150) (e.g., battery), payload securing mechanism (payload securing unit 107), and other components.

The UAV 100 may be provided with a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations of the UAV 100, including operations of various embodiments. In some embodiments, the processor 120 may be coupled to a payload securing unit 107 and landing unit 155. The processor 120 may be powered from the power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers includes a motor, a motor shaft, and a propeller.

Through control of the individual motors of the rotors 101, the UAV 100 may be controlled in flight. In the processor 120, a navigation unit 125 may collect data and determine the present position and orientation of the UAV 100, the appropriate course towards a destination, and/or the best way to perform a particular function.

An avionics component 126 of the navigation unit 125 may be configured to provide flight control-related information, such as altitude, attitude, airspeed, heading and similar information that may be used for navigation purposes. The avionics component 126 may also provide data regarding the orientation and accelerations of the UAV 100 that may be used in navigation calculations. In some embodiments, the information generated by the navigation unit 125, including the avionics component 126, depends on the capabilities and types of sensor(s) 140 on the UAV 100.

The control unit 110 may include at least one sensor 140 coupled to the processor 120, which can supply data to the navigation unit 125 and/or the avionics component 126. For example, the sensor(s) 140 may include inertial sensors, such as one or more accelerometers (providing motion sensing readings), one or more gyroscopes (providing rotation sensing readings), one or more magnetometers (providing direction sensing), or any combination thereof. The sensor(s) 140 may also include GPS receivers, barometers, thermometers, audio sensors, motion sensors, etc. Inertial sensors may provide navigational information, e.g., via dead reckoning, including at least one of the position, orientation, and velocity (e.g., direction and speed of movement) of the UAV 100. A barometer may provide ambient pressure readings used to approximate elevation level (e.g., absolute elevation level) of the UAV 100.

In some embodiments, the communication resource(s) 130 may include a GPS receiver, enabling GNSS signals to be provided to the navigation unit 125. A GPS or GNSS receiver may provide three-dimensional coordinate information to the UAV 100 by processing signals received from three or more GPS or GNSS satellites. GPS and GNSS receivers can provide the UAV 100 with an accurate position in terms of latitude, longitude, and altitude, and by monitoring changes in position over time, the navigation unit 125 can determine direction of travel and speed over the ground as well as a rate of change in altitude. In some embodiments, the navigation unit 125 may use an additional or alternate source of positioning signals other than GNSS or GPS. For example, the navigation unit 125 or one or more communication resource(s) 130 may include one or more radio receivers configured to receive navigation beacons or other signals from radio nodes, such as navigation beacons (e.g., very high frequency (VHF) omnidirectional range (VOR) beacons), Wi-Fi access points, cellular network sites, radio stations, etc. In some embodiments, the navigation unit 125 of the processor 120 may be configured to receive information suitable for determining position from the communication resources(s) 130. In some embodiments, the UAV 100 may use an alternate source of positioning signals (i.e., other than GNSS, GPS, etc.). Because UAVs often fly at low altitudes (e.g., below 400 feet), the UAV 100 may scan for local radio signals (e.g., Wi-Fi signals, Bluetooth signals, cellular signals, etc.) associated with transmitters (e.g., beacons, Wi-Fi access points, Bluetooth beacons, small cells (picocells, femtocells, etc.), etc.) having known locations such as beacons or other signal sources within restricted or unrestricted areas near the flight path. The navigation unit 125 may use location information associated with the source of the alternate signals together with additional information (e.g., dead reckoning in combination with last trusted GNSS/GPS location, dead reckoning in combination with a position of the UAV takeoff zone, etc.) for positioning and navigation in some applications. Thus, the UAV 100 may navigate using a combination of navigation techniques, including dead-reckoning, camera-based recognition of the land features below and around the UAV 100 (e.g., recognizing a road, landmarks, highway signage, etc.), etc. that may be used instead of or in combination with GNSS/GPS location determination and triangulation or trilateration based on known locations of detected wireless access points.

In some embodiments, the control unit 110 may include a camera 127 and an imaging system 129. The imaging system 129 may be implemented as part of the processor 120, or may be implemented as a separate processor, such as an application specific integrated circuit (ASIC), a field programmable gate array (FPGA), or other logical circuitry. For example, the imaging system 129 may be implemented as a set of executable instructions stored in the memory unit 121 that execute on the processor 120 coupled to the camera 127. The camera 127 may include sub-components other than image or video capturing sensors, including auto-focusing circuitry, International Organization for Standardization (ISO) adjustment circuitry, and shutter speed adjustment circuitry, etc.

The control unit 110 may include one or more communication resources 130, which may be coupled to at least one transmit/receive antenna 131 and include one or more transceivers. The transceiver(s) may include any of modulators, de-modulators, encoders, decoders, encryption modules, decryption modules, amplifiers, and filters. The communication resource(s) 130 may be capable of device-to-device and/or cellular communication with other UAVs, wireless communication devices carried by a user (e.g., a smailphone), a UAV controller, and other devices or electronic systems (e.g., a vehicle electronic system).

The processor 120 and/or the navigation unit 125 may be configured to communicate through the communication resource(s) 130 with a wireless communication device 170 through a wireless connection (e.g., a cellular data network) to receive assistance data from the server and to provide UAV position information and/or other information to the server.

A bi-directional wireless communication link 132 may be established between transmit/receive antenna 131 of the communication resource(s) 130 and the transmit/receive antenna 171 of the wireless communication device 170. In some embodiments, the wireless communication device 170 and UAV 100 may communicate through an intermediate communication link, such as one or more wireless network nodes or other communication devices. For example, the wireless communication device 170 may be connected to the communication resource(s) 130 of the UAV 100 through a cellular network base station or cell tower. Additionally, the wireless communication device 170 may communicate with the communication resource(s) 130 of the UAV 100 through a local wireless access node (e.g., a WiFi access point) or through a data connection established in a cellular network.

In some embodiments, the communication resource(s) 130 may be configured to switch between a cellular connection and a Wi-Fi connection depending on the position and altitude of the UAV 100. For example, while in flight at an altitude designated for UAV traffic, the communication resource(s) 130 may communicate with a cellular infrastructure in order to maintain communications with the wireless communication device 170. For example, the UAV 100 may be configured to fly at an altitude of about 400 feet or less above the ground, such as may be designated by a government authority (e.g., FAA) for UAV flight traffic. At this altitude, it may be difficult to establish communication links with the wireless communication device 170 using short-range radio communication links (e.g., Wi-Fi). Therefore, communications with the wireless communication device 170 may be established using cellular telephone networks while the UAV 100 is at flight altitude. Communications with the wireless communication device 170 may transition to a short-range communication link (e.g., Wi-Fi or Bluetooth) when the UAV 100 moves closer to a wireless access point.

While the various components of the control unit 110 are illustrated in FIG. 1 as separate components, some or all of the components (e.g., the processor 120, the motor system 123, the communication resource(s) 130, and other units) may be integrated together in a single device or unit, such as a system-on-chip. The UAV 100 and the control unit 110 may also include other components not illustrated in FIG. 1.

A UAV may be configured to track and follow a user, in what is known as a "follow-me" mode. For example, a UAV may be configured to follow behind or ahead of (or above) a user and track the user, for example, by photographing or taking video of the user (e.g., fly ahead or behind a user skiing while recording video of the user).

Various embodiments include a UAV configured to fly ahead of the user monitoring the area ahead of and around the user rather than or in addition to photographing the user. The UAV may be configured to monitor areas surrounding and/or ahead of the user for potential dangers and warn the user of those dangers. Such UAVs may have applications in pedestrian/cyclist safety and other situations, such as a navigation guide for the elderly, or as a navigation aide to customers in large commercial or public areas such as amusement parks, parking lots, and shopping areas.

Figure 2A:
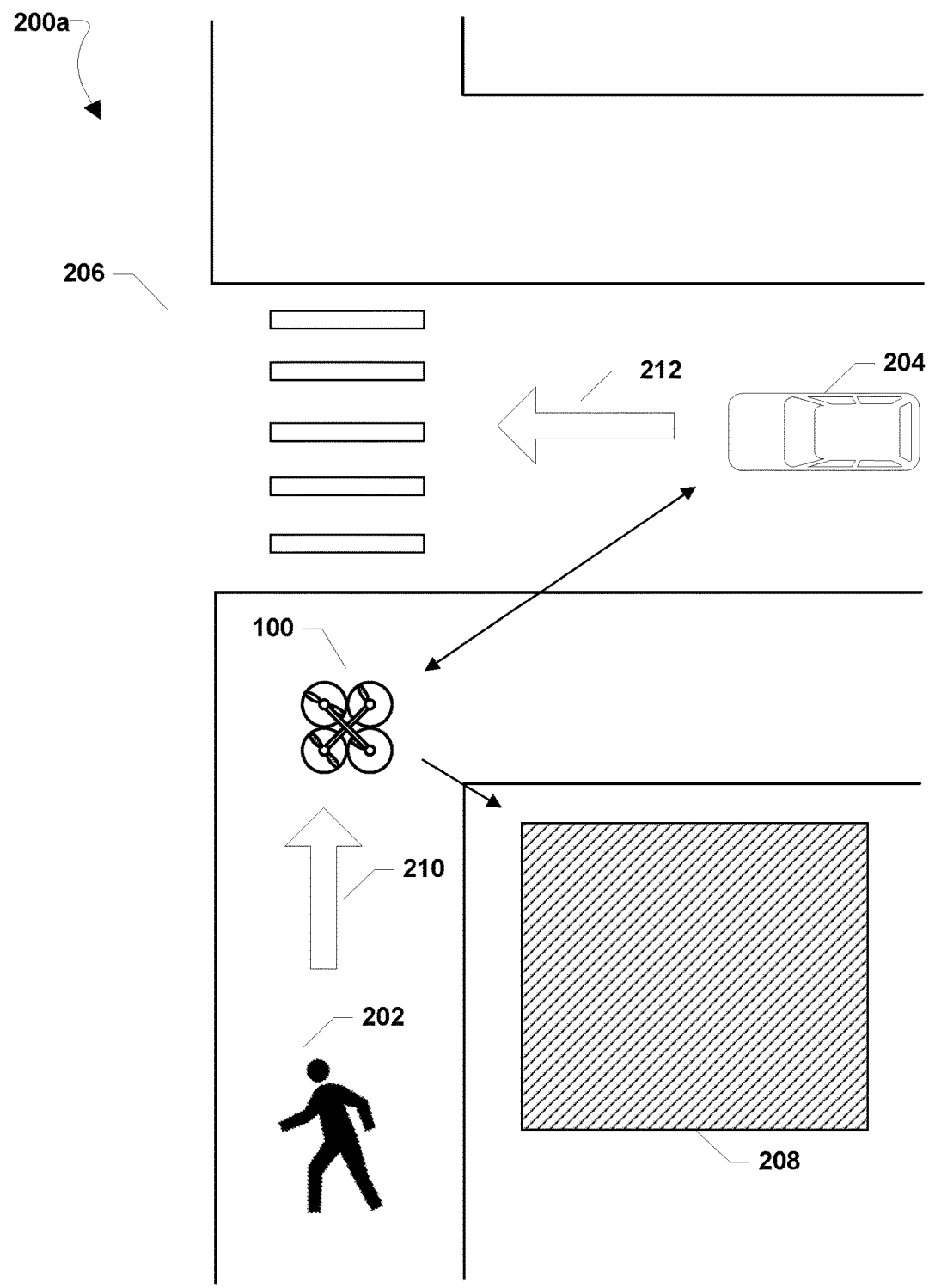
FIG. 2A is a diagram illustrating a UAV monitoring an area surrounding a user for dangers according to various embodiments.
Figure 2B:
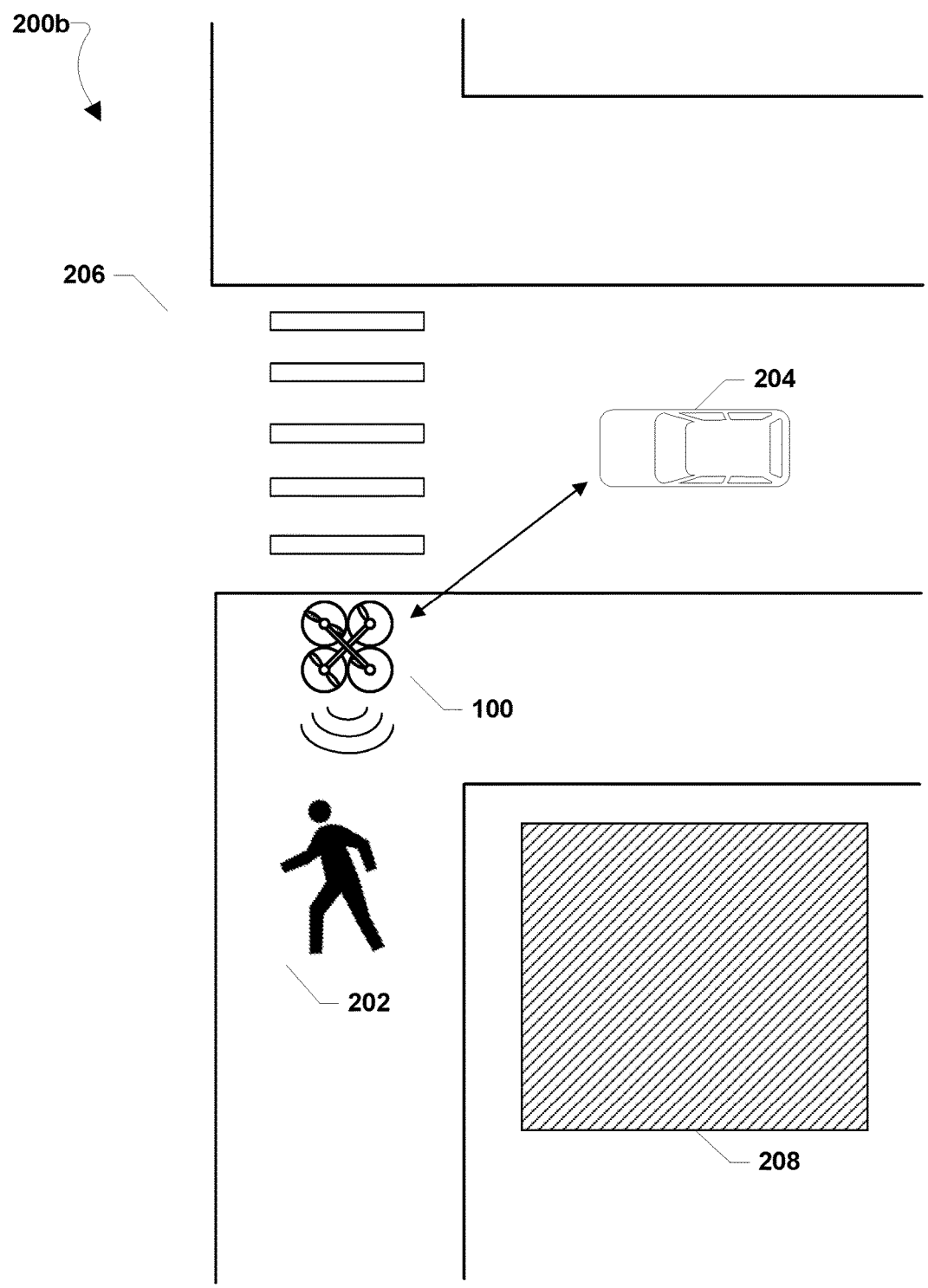
FIG. 2B is a diagram illustrating a UAV mitigating dangers posed to a user according to various embodiments.

FIGS. 2A-2B are diagrams illustrating a UAV (e.g., 100) monitoring an area surrounding a user for dangers and mitigating detected dangers according to various embodiments. With reference to FIGS. 1-2B, the diagram 200a includes a user 202, who may be a pedestrian, biker, jogger, or other person traveling in an open space such as a sidewalk, road, or the like. The user 202 may control a UAV, such as the UAV 100. For example, the user 202 may have a wireless communication device (e.g., the wireless communication device 170), such as a smart phone, smart watch, etc., that may be used to control the UAV 100 and also receive messages and warnings from the UAV 100.

The UAV 100 may be configured to maintain a certain monitoring position relative to the user 202. For example, the UAV 100 may utilize sensors, cameras, image processing, pattern recognitions, tracking algorithms, GPS, navigation systems, and other hardware and/or software components to determine one or more attributes of the user 202. In some embodiments, the attributes of the user 202 may be obtained by image recognition and tracking of the user 202. In other embodiments, the attributes of the user 202 may be obtained from a device carried by the user 202 that the UAV 100 may communicate with (e.g., a wireless communication device). In other words, the UAV 100 may track a device carried by the user 202, and the attributes measured and/or obtained by the device may be used as the attributes of the user 202. The attributes may include one or more of the current position of the user 202, the current velocity (i.e., speed and direction) of the user 202, the height of the user 202, the size of the user 202 (or size of user along with addition people accompanying the user 202). These attributes may help determine the monitoring position of the UAV 100 relative to the user 202. For example, the velocity of the user 202 may be used to determine the velocity of the UAV 100 in order to maintain a stationary position relative to the user 202. The height of the user 202 may be utilized to determine the height of the UAV 100 (e.g., the UAV 100 may fly lower if the user 202 is a child rather than an adult). For example, for an adult jogger the UAV 100 may position itself 3-4 meters in front of the jogger and 1-2 meters above the jogger. Thus, for instance, in some embodiments, the distance from the user 202 may increase as the velocity of the user 202 increases, and vice versa. By contrast, for a walking child the UAV 100 may position itself 1-2 meters ahead of the child and 0.5 meters above the child.

If there are additional people traveling with the user 202, the UAV 100 may also determine one or more attributes of additional people as well. The UAV 100 may average the attributes of all of the detected persons to determine the monitoring position, or may utilize the minimum or maximum values of the attributes, or may determine its monitoring position via other methods given the attributes of all the people in the group.

The UAV 100 may also utilize sensors, cameras, image processing, pattern recognitions, tracking algorithms, GPS, navigation systems, and information obtained from various communication networks (e.g., mobile telephony networks) to determine certain environmental conditions that may affect the monitoring position. Such environmental conditions may include, for example, lighting and weather conditions, the current time, and the heights of nearby stationary objects. For example, the UAV 100 may stay closer to the user 202 when it is dark, or when it is foggy or rainy. In another example, if there is a stationary object 208 near the user 202 (e.g., bushes), the UAV 100 may fly at a height higher than the stationary object 208 in order to have unobstructed views of the surrounding area.

The UAV 100 may be configured to enable the user 202 to manually configure the monitoring position of the UAV 100, for example by using a wireless communication device or UAV controller. For example, the user 202 may specify that the UAV 100 should remain far ahead when the user 202 is riding a bike, and may specify that the UAV 100 should remain close when the user is walking alone in the dark. The UAV 100 may periodically recalculate the monitoring position to account for changes in the user's speed or direction.

The UAV 100 may monitor an area surrounding the user 202 for potential dangers. In order to monitor for dangers, the UAV 100 may determine an estimated travel path 210 of the user 202 using sensors, cameras, image processing, pattern recognitions, tracking algorithms, GPS, navigation systems, and other hardware and/or software components. For example, the UAV 100 may determine the likely position and velocity of the user 202 during a specified future time frame from the user's current position and velocity, the user's prior travel path, navigation data (e.g., if the user 202 has input a destination to the UAV 100), the geography of the surrounding area, and/or other information. For example, if the user 202 is walking down a street leading to an intersection 206, the UAV 100 may predict that the user 202 may continue walking down the same street in the same direction and cross the intersection 206. The UAV 100 may determine a probability of accuracy or uncertainty of the estimated travel path 210, which may be expressed as a probability or confidence value that the estimated travel path 210 is accurate (e.g., 90% accuracy), a standard deviation of error, or some other statistical representation.

The specified time frame for which the UAV 100 may estimate the travel path may depend on the user's current position and velocity, the monitoring position of the UAV 100, user-configured preferences, and other factors. For example, if the user 202 is traveling at a relatively high speed (e.g., riding a bike), the UAV 100 may estimate the travel path of the user 202 for the next minute. If the user 202 is traveling at a relatively slow speed (e.g., walking), the UAV 100 may estimate the travel path of the user 202 for the next 30 seconds. If the monitoring position of the UAV 100 is far ahead of the user 202, the UAV 100 may estimate a longer travel path than if the monitoring position of the UAV 100 is closer to the user 202. The user 202 may also configure the UAV 100 to estimate the travel path of the user 202 for a specified future time frame.

The UAV 100 may determine an area to be scanned based on the estimated travel path 210 of the user 202. The area to be scanned may also be based on the position and velocity of the user 202, or user-defined settings. For example, if the user 202 is traveling at a relatively high speed (e.g., running or riding a bike), the UAV 100 may scan an area of up to 1 kilometer from all points of the estimated travel path 210. If the user 202 is traveling at a relatively slow speed, the UAV 100 may scan an area of up to 0.5 kilometers from all points of the estimated travel path 210. The user 202 may also specify the scan distance of the UAV 100. The area to be scanned may also include areas to the sides and behind the user to detect hazards that may approach the user 202 from all sides. For example, in addition to scanning an area surrounding the estimated travel path 210, the UAV 100 may also scan an area within a certain radius of the current location of the user 202. The UAV 100 may also scan an area surrounding the prior travel path of the user 202.

The UAV 100 may scan the determined area for objects. The UAV 100 may utilize sensors, cameras, image processing, pattern recognitions, tracking algorithms, device-to-device and/or cellular communication, GPS, navigation systems, and other hardware and/or software components to scan the determined area and detect objects in the area. For example, the UAV 100 may utilize a camera to capture images and video of the determined area and use image processing and tracking algorithms to detect stationary and moving objects (e.g., vehicles, humans, animals, bushes, trees, curbs). In some embodiments, a threshold for the size (and/or velocity) of the objects may be set by the user 202. For example, the user 202 may configure the UAV 100 to detect objects that are at least the size of vehicles, but not of humans, animals, or plants.

The UAV 100 may also communicate with other objects capable of wireless communication, such as other UAVs, wireless communication devices, or vehicles, in order to determine whether those objects are present in the determined scanning area. For example, the UAV 100 may communicate with the electronic system of a vehicle 204 that is within the determined area through device-to-device and/or cellular communication protocols or through Wi-Fi. The vehicle 204 may be an autonomous vehicle or may have a driver. The vehicle 204 may provide information to the UAV 100 about the vehicle 204, such as the vehicle's position and velocity.

The UAV 100 may estimate the travel path of each object the UAV 100 has detected inside the determined scanning area. This estimation may be performed similarly to the estimated travel path 210 of the user 202. If the object is stationary, then the estimated travel path may be that the object remains in the same place. For example, the UAV 100 may obtain the position and velocity of each object using sensors, cameras, image processing, pattern recognitions, tracking algorithms, GPS, navigation systems, and other hardware and/or software components. The UAV 100 may determine a travel path for each object using this information. The specified time frame for which to estimate the travel path may be the same as for the estimated travel path 210 of the user 202. For example, the UAV 100 may calculate the estimated travel path 210 of the user 202 over a duration of one minute, and also calculate an estimated travel path 212 of the vehicle 204 over a duration of one minute. The UAV 100 may determine a probability of accuracy or uncertainty of the estimated travel path 212, which may be expressed as a probability or confidence value that the estimated travel path 212 is accurate (e.g., 90% accuracy), a standard deviation of error, or some other statistical representation.

The UAV 100 may determine whether the estimated travel paths of any of the detected objects intersect the estimated travel path 210 of the user 202 by at least a predetermined probability. If any objects do intersect with the estimated travel path 210, the UAV 100 may determine that the object is an approaching object. The UAV 100 may utilize various approaches for mathematical or statistical analysis to determine whether two estimated travel paths will intersect by at least a predetermined probability. In some embodiments, the predetermined probability may be specified by the user 202. For example, the user 202 may specify that two estimated travel paths are considered intersecting if there is at least a 75% probability that the estimated travel paths intersect according to statistical analysis. The UAV 100 may determine that the estimated travel path 210 of the user 202 and the estimated travel path 212 of the vehicle 204 will intersect with a probability of 85%, and therefore satisfies the predetermined probability specified by the user 202.

For each approaching object (i.e., each object that will intersect the estimated travel path 210 of the user 202 by at least the predetermined probability), the UAV 100 may determine whether or not those approaching objects may pose a danger to the user 202. In order to assess potential danger, the UAV 100 may determine one or more attributes of each approaching object. The attributes may include, but are not limited to, the position of the approaching object, the velocity of the approaching object, the size of the approaching object, and dangerous characteristics of the object (e.g., fire, toxicity, potential fall hazard, etc.). These attributes may be obtained using sensors, cameras, image processing, pattern recognitions, tracking algorithms, device-to-device and/or cellular communication, GPS, navigation systems, and other hardware and/or software components in the UAV 100. The attributes may have previously been obtained when detecting the approaching object and estimating its travel path. For example, the UAV 100 may communicate with the vehicle 204 using device-to-device and/or cellular communication to obtain position, velocity, size, and other attributes for the vehicle 204.

In some embodiments, the UAV 100 may compare the attributes of the approaching object with a one or more thresholds. The UAV 100 may store a threshold for each attribute, such as a distance threshold, a velocity threshold, and a size or type threshold. If the attributes of the approaching object exceeds one or more thresholds, the UAV 100 may determine that the approaching object poses a danger to the user 202. For example, the UAV 100 may store a velocity threshold of 25 kilometers/hour (km/h), and the vehicle 204 may be traveling at 50 km/h. Thus, the UAV 100 may determine that the vehicle 204 may pose a danger to the user 202. In another example, the UAV 100 may store a size threshold of a small passenger vehicle. The thresholds may be expressed by reference to examples (e g., animal, human, passenger vehicle, truck, etc.) or may be expressed in numerical form (e.g., 1 square meter). The UAV 100 may determine that the vehicle 204 is at least the size of a small passenger vehicle and therefore may pose a danger to the user 202. In another example, the UAV 100 may determine that the intersection 206 satisfies a type threshold for intersection objects and may pose a danger to the user 202, regardless of whether a vehicle will cross the intersection 206. The user 202 may configure each threshold according to the user's preferences or the current use situation.

If the UAV 100 determines that the estimated travel path of the approaching object will intersect with the estimated travel path of the user 202 and that at least one attribute of the approaching object exceeds a threshold, the approaching object may be considered to pose a danger to the user 202. UAV 100 may perform one or more actions to mitigate the danger, as shown in diagram 200b. The diagram 200b shows both the user 202 and the vehicle 204 approaching the intersection 206. The UAV 100 may perform one or more actions to warn the user 202 or the vehicle 204, or prevent a collision. The actions may include, but are not limited to, generating a visual warning to the user 202 (e.g., flashing lights), sounding an audio warning to the user 202 (e.g., from a speaker on the UAV), blocking the user's 202 path toward the object (or a point of intersection with the object), escorting the user 202 past the danger posed by the object, blocking the path of the approaching object, sending a warning to a wireless communication device carried by the user 202, and sending a warning to the approaching object using device-to-device and/or cellular communication. For example, in the diagram 200b the UAV 100 may position itself in front of the intersection 206 to block the path of the user 202, display a visual warning to the user 202, and communicate with the vehicle 204 to indicate that the user 202 is approaching the intersection 206.

The UAV 100 may continue to perform the one or more actions to mitigate the danger as long as the UAV 100 determines that the approaching object still poses a danger. To determine whether the danger is still ongoing, the UAV 100 may determine whether the estimated travel path of the approaching object will still intersect with the estimated travel path of the user 202 within a predetermined probability, and/or whether the one or more attributes of the approaching object still exceeds at least one threshold. For example, if the vehicle 204 has passed the intersection 206, the UAV 100 may determine that the estimated travel path 210 of the user 202 and the estimated travel path 212 of the vehicle 204 no longer intersect and therefore the vehicle 204 no longer poses a danger. In another example, the UAV 100 may determine that the vehicle 204 has stopped before the intersection 206, and therefore the vehicle 204 no longer poses a danger. Once the danger has passed, the UAV 100 may proceed ahead at its monitoring position and continuing to scan the area surrounding the user 202 for dangers, and mitigating detected dangers.

In some embodiments, there may be more than one UAV that monitors for dangers for the user 202. For example, separate UAVs may monitor for dangers coming from different directions, or for different types of dangers (e.g., one monitors for vehicles, another for other pedestrians, another for inanimate objects). The UAVs may communicate with each other using device-to-device and/or cellular communication. There may be a master UAV that controls the other UAVs, receives information from the other UAVs, determines whether detected approaching objects pose a danger to the user, and controls the other UAVs to perform various actions to mitigate the danger.

Figure 3:
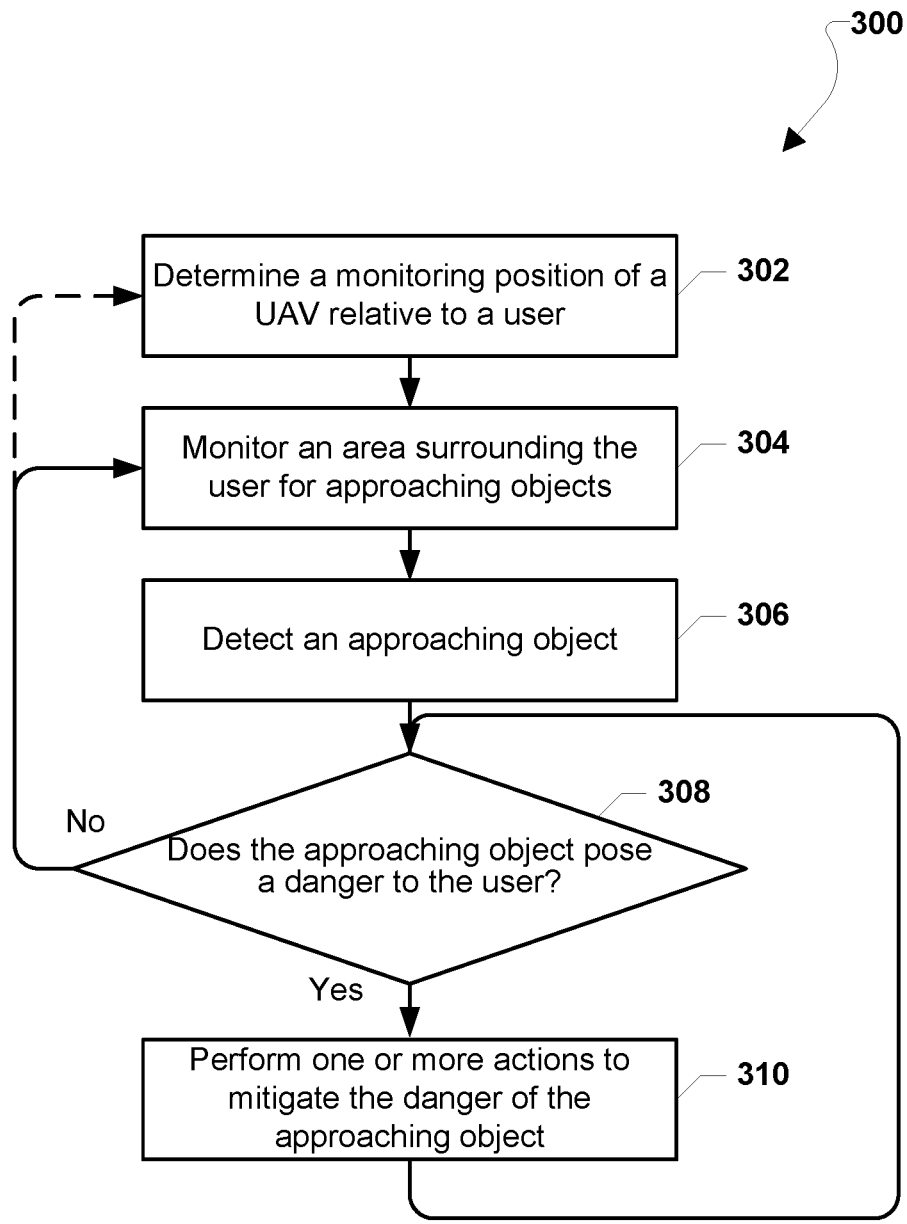
FIG. 3 is a process flow diagram illustrating a method for utilizing at least one UAV to monitor hazards for a user according to various embodiments.

FIG. 3 illustrates a method 300 for utilizing at least one UAV (e.g., 100 in FIGS. 1-2B) to monitor hazards for a user according to various embodiments. With reference to FIGS. 1-3, the operations of the method 300 may be performed by one or more processors of the one or more UAVs (e.g., the processor 120). The UAV may have sensors, cameras, image processing, pattern recognitions, tracking algorithms, device-to-device and/or cellular communication, GPS, navigation systems, and other hardware and/or software components for detecting objects around the UAV, such as a user controlling the UAV and objects in the vicinity of the user that may pose a danger to the user. The user may be a pedestrian, biker, or other person traveling in an open space (e.g., through roads and streets). The user may carry a wireless communication device that may control the UAV.

Figure 4:
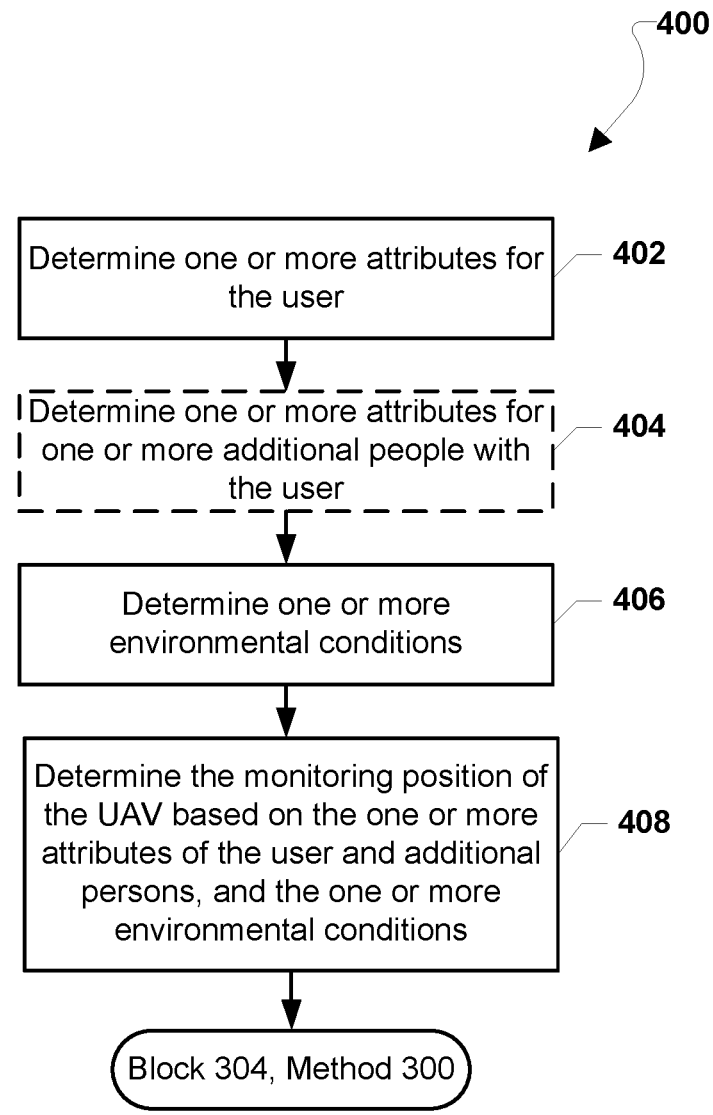
FIG. 4 is a process flow diagram illustrating a method for determining a monitoring position of a UAV relative to a user according to various embodiments.

In block 302, the processor(s) of the at least one UAV may determine a monitoring position for the UAV(s) relative to the user. The monitoring position may be a position from which the UAV is able to monitor for potential dangers in the travel path of the user. For example, the UAV may determine a monitoring position that is a few meters higher than the user so that the UAV has line of sight to various nearby objects, and is several meters ahead of the user so that there is enough time to mitigate any detected dangers before the user reaches the position of the UAV. The UAV may determine the monitoring position from various attributes of the user (e.g., position, velocity, height), various environmental conditions (e.g., lighting, weather, time, height of surrounding stationary objects), and/or the like. In some embodiments, the user may manually specify a monitoring position for the UAV, and so the processor may skip the operations in block 302. Determining a monitoring position for the UAV is described in more detail with reference to method 400 (FIG. 4).

Figure 5:
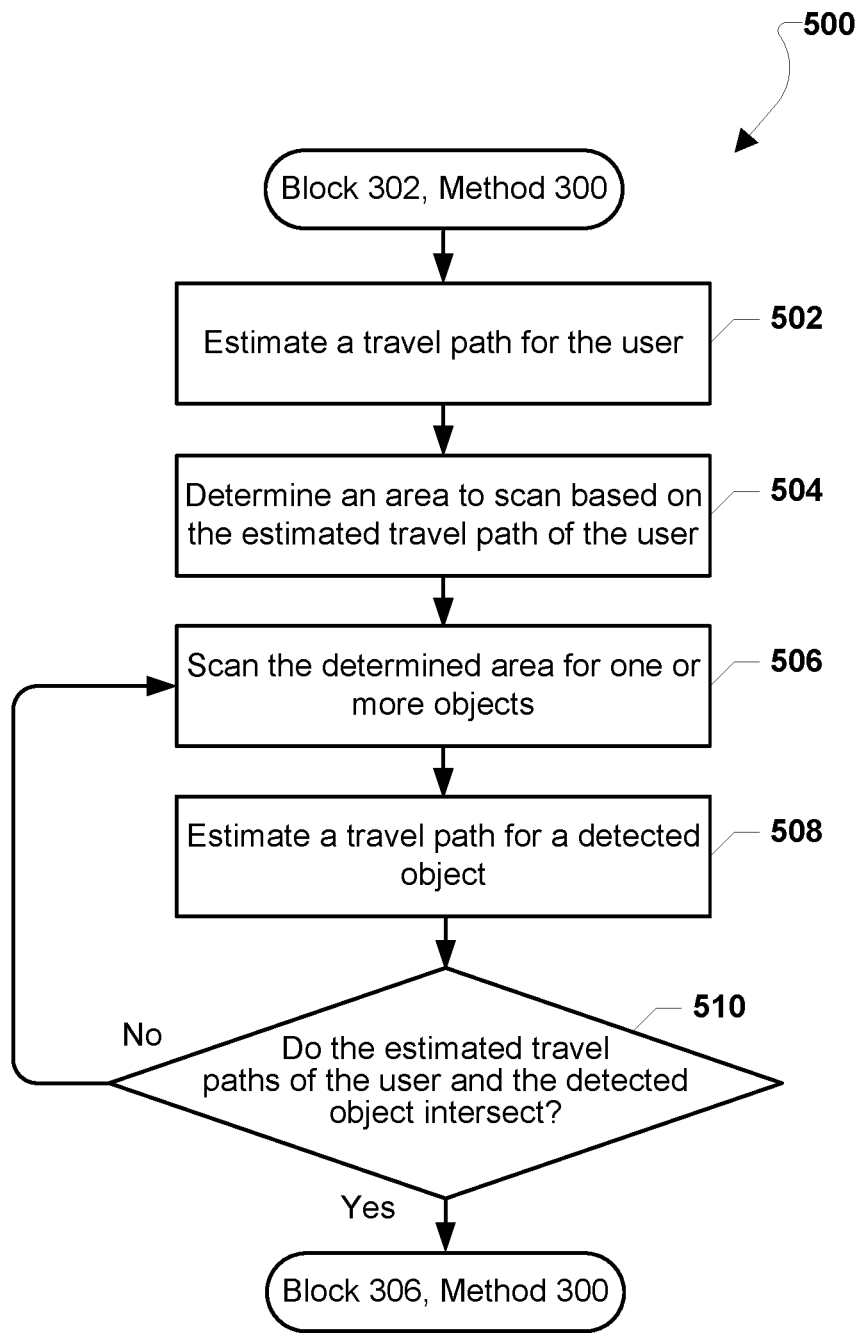
FIG. 5 is a process flow diagram illustrating a method for monitoring an area surrounding a user for approaching objects according to various embodiments.

In block 304, the processor(s) may monitor an area surrounding the user for objects. The processor may first estimate a travel path for the user based on the user's position, velocity, travel path history, and/or navigation information inputted by the user. The processor may utilize sensors, cameras, image processing, pattern recognitions, tracking algorithms, device-to-device and/or cellular communication, GPS, navigation systems, and other hardware and/or software components to detect moving or stationary objects (e.g., other people, animals, vehicles, buildings, trees and plants, curbs, intersections, and other stationary or moving objects) in a determined area around the estimated travel path of the user. The determined area may depend on the position and velocity of the user, or may be manually specified by the user. The determined area may also include a specified radius around the user, and/or an area surrounding the prior travel path of the user in order to scan for dangers approaching from the sides or from behind the user. For example, the determined area to scan for objects may be between 0-2 kilometers from all points of the estimated travel path and the prior travel path, as well as a radius 1 km radius from the current location of the user. The processor may estimate the travel path for each detected object and then determine whether the estimated travel path for any object will intersect with the estimated travel path of the user. Monitoring an area surrounding the user for objects is described in more detail with reference to method 500 (FIG. 5).

In block 306, the processor(s) may detect an approaching object. An approaching object may be an object for which the estimated travel path intersects with the estimated travel path of the user by at least a predetermined probability (e.g., a vehicle that will cross the same intersection that the user will soon cross). For example, the processor may determine a probability of accuracy or uncertainty of each estimated travel path, a confidence value or probability that the object or user will actually follow the travel path. The processor may conduct a statistical analysis to determine whether two travel paths will intersect within a radius of hazard of the object by at least a predetermined probability. The predetermined probability may be specified by the user.

In determination block 308, the processor(s) may determine whether the approaching object poses a danger to the user. The processor may determine one or more attributes of the approaching object (e.g., position, velocity, size, type, hazards, etc.) and compare the attributes to one or more corresponding thresholds. If the attributes exceeds at least one of the thresholds, then the approaching object may be considered a danger to the user. For example, if a vehicle is approaching with a high velocity and the vehicle and user are on a collision course, the processor may determine that the vehicle poses a danger to the user. As a further example, if the estimated closest point of approach of the vehicle and user is greater than a threshold distance (e.g., 10 feet, for example), the processor may determine that the vehicle does not pose a danger to the user. As a further example, if the approach object is a fire or hazardous chemical, the processor may determine whether the user's path will bring the user close enough the object (based on the nature of the hazard) to pose a danger to the user.

Figure 6:
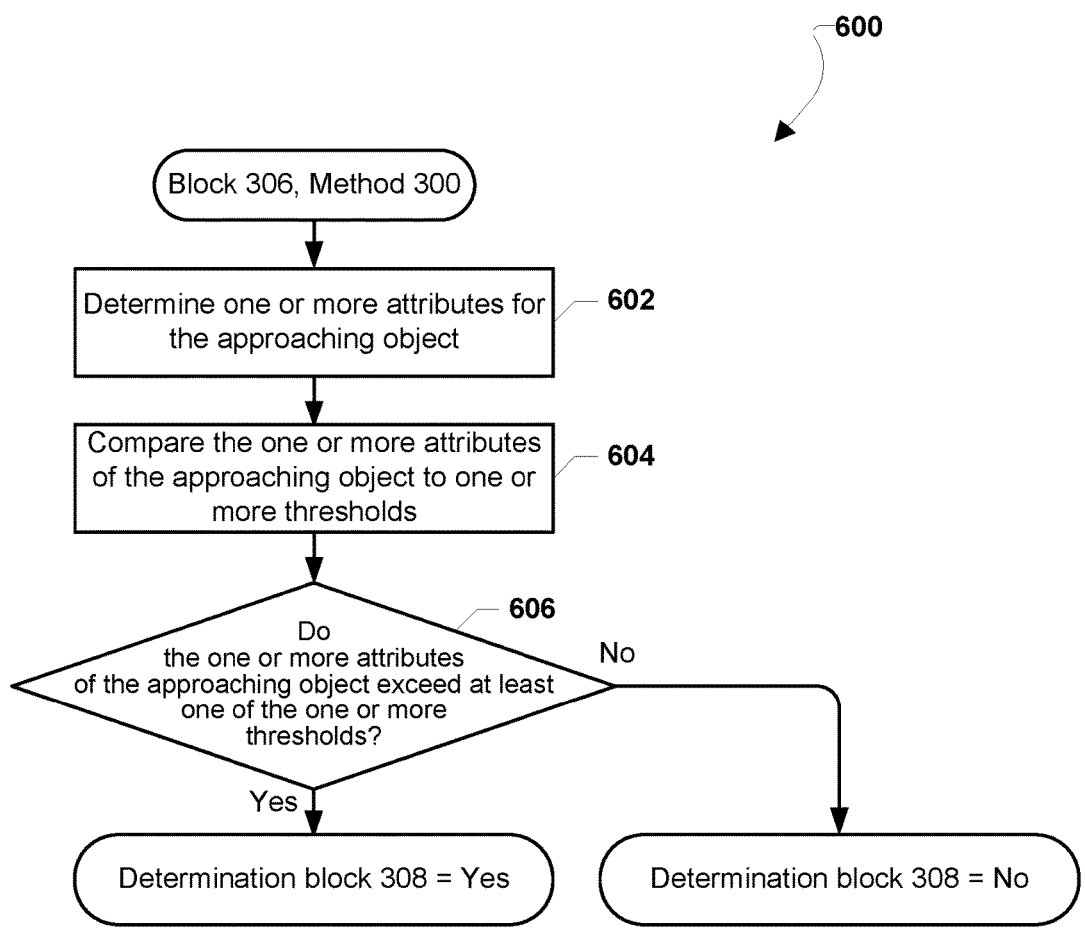
FIG. 6 is a process flow diagram illustrating a method for determining whether an approaching object poses a danger to a user according to various embodiments.

In some embodiments and situations, the processor may utilize device-to-device and/or cellular communications to communicate with some objects (e.g., vehicles with electronic communications systems, wireless communication devices, other UAVs) and obtain the attributes from the electronic objects. Determining whether the approaching object poses a danger to the user is described in more detail with reference to method 600 (FIG. 6).

In response to determining that the approaching object does not pose a danger to the user (i.e., determination block 308="No"), the processor(s) may continue to monitor the area surrounding the user for objects in block 304. Alternatively, the processor may re-determine the monitoring position of the UAV relative to the user in block 302. For example, every few seconds the processor may re-determine the monitoring position to account for changes in the position and velocity of the user. The frequency at which the processor may re-determine the monitoring position may depend on the velocity of the user and other factors. For example, if the user is traveling at a relatively high speed (e.g., on a bike), the processor may re-determine the monitoring position more frequently.

In response to determining that the approaching object poses a danger to the user (i.e., determination block 308="Yes"), the processor(s) may perform one or more actions to mitigate the danger of the approaching object in block 310. Some non-limiting examples of the actions that may be performed include generating a visual warning to the user (e.g., flashing lights), sounding an audio warning to the user, blocking the user's path, escorting the user past the danger, blocking the path of the approaching object, sending a warning to a wireless communication device carried by the user, and sending a warning to the approaching object using device-to-device and/or cellular communication.

The processor(s) may continue to determine whether the approaching object poses a danger to the user in determination block 308. For example, the processor may re-estimate the travel paths of the user and the approaching object to determine whether they still intersect, and also determine whether the one or more attributes of the approaching object still exceed at least one threshold. So long as the approaching object continues to pose a danger to the user, the processor may continue to perform one or more actions to mitigate the action until the danger has passed (e.g., if a vehicle passes the travel path of the user or if the vehicle stops). In this manner, the method 300 provides a way to utilize a UAV to monitor and mitigate hazards for users traveling in open spaces.

FIG. 4 illustrates a method 400 for determining a monitoring position for a UAV relative to a user according to various embodiments. The method 400 may implement the operations represented by block 302 of the method 300. With reference to FIGS. 1-4, the operations of the method 400 may be performed by one or more processors of one or more UAVs (e.g., the processor 120). The UAV may have sensors, cameras, image processing, pattern recognitions, tracking algorithms, GPS, navigation systems, and other hardware and/or software components for detecting objects around the UAV, such as a user controlling the UAV and objects in the vicinity of the user that may pose a danger to the user. The user may be a pedestrian, biker, or other person traveling in an open space (e.g., through roads and streets). The user may carry a wireless communication device that may control the UAV.

In block 402, the UAV processor may determine one or more attributes of the user. The attributes may include, but are not limited to, the user's position, velocity, and height of the user. These attributes may determine, for example, how far in front of the user that the UAV should be located, how far above the user that the UAV may be located, and how fast the UAV should move in order to keep pace with the user. The UAV may utilize sensors, cameras, image processing, pattern recognitions, tracking algorithms, GPS, navigation systems, and other hardware and/or software components to capture images and movements of the user, and combine this information with GPS and navigation data. In some embodiments, the UAV may communicate with a device carried by the user (e.g., a wireless communication device) and obtain one or more of the attributes of the user from the device. For example, the device may determine its current position and velocity, which are also the same position and velocity of the user, and transmit the information to the UAV.

In block 404, the processor may optionally determine one or more attributes of one or more additional people traveling with the user. If the user is traveling with a group of people, the processor may also determine attributes (e.g., position, velocity, height) of each person in the group. This allows the UAV to be able to monitor for dangers for the entire group of people. The attributes of the additional people may be obtained in a similar manner to the attributes of the user.

In block 406, the processor may determine one or more environmental conditions that may affect the monitoring position of the UAV. The environmental conditions may include, but are not limited to, lighting conditions, weather conditions, the current time, and the height of nearby stationary objects. For example, the UAV should remain closer to the user during nighttime or when it is foggy, rainy, or snowy. In another example, the height of nearby objects may determine the height of the UAV so that the cameras and sensors of the UAV are not blocked by the objects. The processor may utilize sensors, cameras, image processing, pattern recognitions, tracking algorithms, GPS, navigation systems, and information obtained through a network connection (e.g., utilizing satellite or mobile telephony network data to determine the current weather) to determine the one or more environmental conditions.

In block 408, the processor may determine the monitoring position of the UAV based on the one or more attributes of the user and any additional people with the user, and the one or more environmental conditions. For example, if the user is a small child walking down the street, the processor may determine that the monitoring position of the UAV may be 1 meter ahead of the user and 0.5 meters above the user. If the user is an adult walking alone at night, the processor may determine that the monitoring position of the UAV may be 2 meters ahead of the user and 1 meter above the user. If the user is riding a bike, the processor may determine that the monitoring position of the UAV may be 3 meters ahead of the user and 2 meters above the user. If there are multiple people traveling together, the processor may average the attributes of all of the people, take the minimum or maximum attribute values, or other methods in order to determine the monitoring position. For example, the height of the UAV may be determined from the height of the tallest person, or the velocity of the UAV may be determined from the average of the velocities of everyone in the group. The processor may monitor an area surrounding the user for objects in block 304 of the method 300.

FIG. 5 illustrates a method 500 for utilizing a UAV to monitor an area surrounding a user for objects according to various embodiments. The method 500 may implement the operations represented by block 304 of the method 300. With reference to FIGS. 1-5, the operations of the method 500 may be performed by one or more processors of one or more UAVs (e.g., the processor 120). The UAV may have sensors, cameras, image processing, pattern recognitions, tracking algorithms, device-to-device and/or cellular communication, GPS, navigation systems, and other hardware and/or software components for detecting objects around the UAV, such as a user controlling the UAV and objects in the vicinity of the user that may pose a danger to the user. The user may be a pedestrian, biker, or other person traveling in an open space (e.g., through roads and streets). The user may carry a wireless communication device that may control the UAV.

After determining a monitoring position for the UAV relative to the user in block 302 of the method 300, the processor may estimate a travel path for the user in block 502. The estimated travel path may be a travel path that the user is most likely to follow in a specified future time frame. For example, the processor may determine the user's most likely travel path for the next minute. The specified time frame over which to estimate the travel path may depend on the position and velocity of the user (e.g., if the user is traveling faster, then the time frame for estimation may be longer), or may be manually specified by the user.

The processor may estimate the user's future position, velocity, and travel path over the given time frame from the user's current position and velocity, the user's prior travel path, navigation data (e.g., if the user has input a destination to the UAV), the geography of the surrounding area, and/or other information. The UAV may gather this information using sensors, cameras, image processing, pattern recognitions, tracking algorithms, GPS, navigation systems, and other hardware and/or software components in the UAV. For example, if the user is walking down a street leading to an intersection, the processor may determine that the user may continue walking down the same street in the same direction and cross the intersection within the next minute. The estimated travel path may then be a straight path along the street for the next minute. The processor may determine a probability of accuracy or uncertainty of the estimate of the travel path, which may be expressed as a probability or confidence value that the estimated travel path is accurate (e.g., 90% accuracy), a standard deviation of error, or some other statistical representation.

In block 504, the processor may determine an area to be scanned based on the estimated travel path of the user. For example, the processor may determine that all areas within a certain distance from any point in the estimated travel path should be scanned. The area to be scanned may also be based on the position and velocity of the user. For example, if the user is traveling at a relatively high speed, the processor may determine the scanning area to be an area of up to 1 kilometer from all points of the estimated travel path. If the user is traveling at a relatively slow speed, the UAV determine the scanning area to be an area of 0.5 kilometers from all points of the estimated travel path. The area to be scanned may also include a specified radius from the current location of the user, and/or may also include an area surrounding the prior travel path of the user (e.g., up to 1 kilometer from all points of the prior travel path). This may allow the UAV to scan for dangers approaching the user from the sides or from behind. In some embodiments, the user may manually specify the determined scanning area for the UAV, and so the processor may not perform the operations in block 504.

In block 506, the processor may scan the determined area for one or more objects. The processor may utilize sensors, cameras, image processing, pattern recognitions, tracking algorithms, device-to-device and/or cellular communication, GPS, navigation systems, and other hardware and/or software components to scan the area and detect objects. For example, the camera may be used to capture images and video within the determined area and image processing, pattern recognition, and tracking algorithms may be used to detect and identify objects from the images and videos. The objects may include moving objects such as animals, other people, and vehicles, and stationary objects such as trees, bushes, intersections, fire hydrants, mailboxes, and street curbs. In some embodiments, there may be a size threshold for detecting objects, which may be manually specified by the user. For example, the UAV may be configured to detect objects that are at least the size of vehicles and ignore objects smaller than vehicles.

The processor may detect some objects utilizing device-to-device and/or cellular communication or Wi-Fi. For example, the UAV may communicate with vehicle electronic systems, wireless communication device, or other UAVs through various communication protocols to detect the presence of vehicles, devices, and people within the determined area. The processor may also obtain various attributes from the object, such as the position, velocity, size, and hazardous nature of the object.

In block 508, the processor may estimate the travel path of a detected object in the determined area. This estimation may be similar to the estimation of the user's travel path. For example, the processor may determine the detected object's future position, velocity, and travel path over a specified time frame from the current position and velocity of the detected object, the prior travel path of the detected object if known, the geography of the surrounding area, and/or other information. If the detected object is stationary, then the travel path may be that the object remains in the same place. The specified time frame for which to estimate the travel path may be the same as for estimating the travel path of the user. For example, the processor may estimate the travel path of the user and the detected object for the next minute. The processor may determine a probability of accuracy or uncertainty of the estimate of the travel path for the detected object, which may be expressed as a probability or confidence value that the estimated travel path is accurate (e.g., 90% accuracy), a standard deviation of error, or some other statistical representation.

In determination block 510, the processor may determine whether the estimated travel paths of the user and the detected object intersect by at least a predetermined probability. The processor may utilize mathematical or statistical analysis methods to determine whether two estimated travel paths will intersect by at least a predetermined probability. The predetermined probability may be manually specified by the user, or the UAV may store a default value. For example, the user may specify that two estimated travel paths be considered intersecting if there is at least a 75% probability that the estimated travel paths intersect according to statistical analysis. The estimated travel path for the user may be 95% accurate, and the estimated travel path of the detected object may be 90% accurate. In such a case, the overall probability that both estimated travel paths are accurate may be calculated as 95%×90%=85.5%. This exceeds the predetermined probability as specified by the user, and so the processor may determine that the estimated travel paths of the user and the detected object intersect by at least the predetermined probability.

In response to determining that the estimated travel paths of the user and the detected object do not intersect by at least the predetermined probability (i.e., determination block 510="No"), the processor may continue to scan the determined area for objects and estimate a travel path for each detected object in blocks 506 and 508. In other words, the processor may continue monitoring the determined area for objects that may intersect the estimated travel path of the user.

In response to determining that the estimated travel paths of the user and the detected object intersect by at least the predetermined probability (i.e., determination block 510="Yes"), the processor may determine that the detected object should be treated as an approaching object in block 306 of the method 300 as described.

FIG. 6 illustrates a method 600 for determining by a UAV whether an approaching object poses a danger to a user according to various embodiments. The method 600 may implement the operations represented by determination block 308 of the method 300. With reference to FIGS. 1-6, the operations of the method 600 may be performed by one or more processors of one or more UAVs (e.g., the processor 120). The UAV may have sensors, cameras, image processing, pattern recognitions, tracking algorithms, device-to-device and/or cellular communication, GPS, navigation systems, and other hardware and/or software components for detecting objects around the UAV, such as a user controlling the UAV and objects in the vicinity of the user that may pose a danger to the user. The user may be a pedestrian, biker, or other person traveling in an open space (e.g., through roads and streets). The user may carry a wireless communication device that may control the UAV.

After detecting an approaching object in block 306 of the method 300, the processor may determine one or more attributes of the approaching object in block 602. The one or more attributes may include, but are not limited to, the position, velocity, size, object type, hazardous nature (e.g., poison, heat, trip hazard, attack potential, etc.) of the approaching object. The one or more attributes may be obtained using sensors, cameras, image processing, pattern recognitions, tracking algorithms, device-to-device and/or cellular communication, GPS, navigation systems, and other hardware and/or software components in the UAV. If the approaching object is capable of device-to-device communication and/or cellular communication and/or Wi-Fi communication (e.g., a vehicle electronic system, another UAV, a wireless communication device), the UAV may also communicate with the approaching object to obtain the attributes. The attributes may have previously been obtained when the processor estimated the travel path of the approaching object.

In block 604, the processor may compare the one or more attributes of the approaching object to one or more thresholds. The UAV may store in memory a corresponding threshold for each attribute (e.g., a velocity threshold, a distance threshold, a size threshold, a type threshold). The value of the thresholds may be manually specified by the user.

In determination block 606, the processor may determine whether the one or more attributes of the approaching object exceed at least one of the one or more thresholds. For example, the processor may determine whether the velocity of the approaching object exceeds a velocity threshold, whether the size of the approaching object exceeds a size threshold, and/or whether the position of the approaching object is within a distance threshold.

In response to determining that the one or more attributes of the approaching object exceeds at least one of the one or more thresholds (i.e., determination block 606="Yes"), the processor may perform one or more actions to mitigate the danger of the approaching object in block 310 of the method 300.

In response to determining that the one or more attributes of the approaching object does not exceed at least one of the one or more thresholds (i.e., determination block 606="No"), the processor may continue to monitor the area surrounding the user for objects in block 304, or alternatively re-determine the monitoring position of the UAV relative to the user in block 302 of the method 300.

Figure 7:
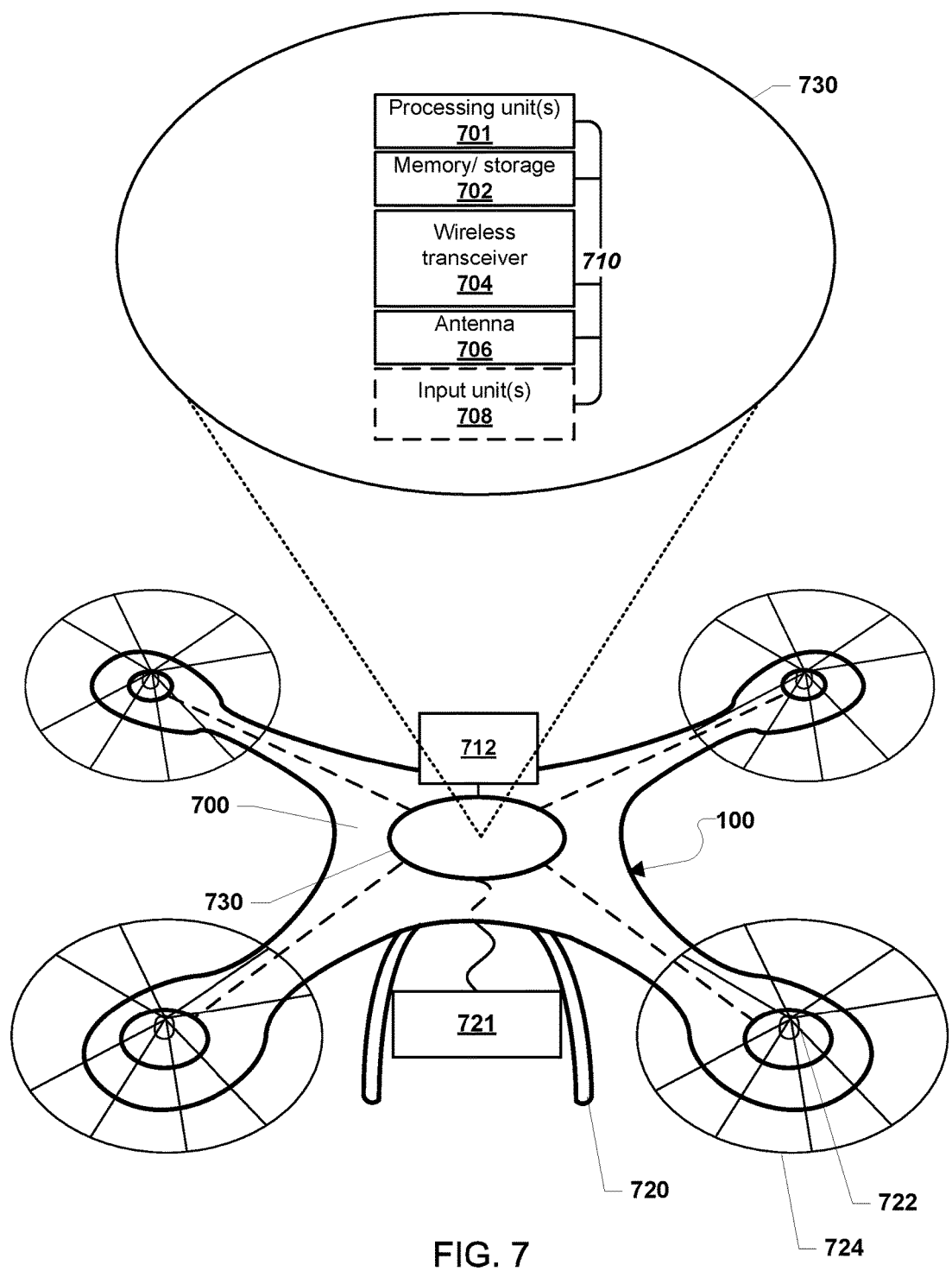
FIG. 7 is a component block diagram of a UAV suitable for use with various embodiments.

Various embodiments may be implemented within a variety of UAVs, an example of which in the form of a four-rotor UAV is illustrated in FIG. 7 that is suitable for use with various embodiments. With reference to FIGS. 1-7, the UAV 100 may include a body 700 (i.e., fuselage, frame, etc.) that may be made out of any combination of plastic, metal, or other materials suitable for flight. The body 700 may include a processor 730 that is configured to monitor and control the various functionalities, subsystems, and/or other components of the UAV 100. For example, the processor 730 may be configured to monitor and control various functionalities of the UAV 100, such as any combination of modules, software, instructions, circuitry, hardware, etc. related to propulsion, navigation, power management, sensor management, and/or stability management.

The processor 730 may include one or more processing unit(s) 701, such as one or more processors configured to execute processor-executable instructions (e.g., applications, routines, scripts, instruction sets, etc.), a memory and/or storage unit 702 configured to store data (e.g., flight plans, obtained sensor data, received messages, applications, etc.), and a wireless transceiver 704 and antenna 706 for transmitting and receiving wireless signals (e.g., a Wi-Fi® radio and antenna, Bluetooth®, RF, etc.). In some embodiments, the UAV 100 may also include components for communicating via various wide area networks, such as cellular network transceivers or chips and associated antenna (not shown). In some embodiments, the processor 730 of the UAV 100 may further include various input units 708 for receiving data from human operators and/or for collecting data indicating various conditions relevant to the UAV 100. For example, the input units 708 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 730 may be connected via a bus 710 or other similar circuitry.

The body 700 may include landing gear 720 of various designs and purposes, such as legs, skis, wheels, pontoons, etc. The body 700 may also include a payload mechanism 721 configured to hold, hook, grasp, envelope, and otherwise carry various payloads, such as boxes. In some embodiments, the payload mechanism 721 may include and/or be coupled to actuators, tracks, rails, ballasts, motors, and other components for adjusting the position and/or orientation of the payloads being carried by the UAV 100. For example, the payload mechanism 721 may include a box moveably attached to a rail such that payloads within the box may be moved back and forth along the rail. The payload mechanism 721 may be coupled to the processor 730 and thus may be configured to receive configuration or adjustment instructions. For example, the payload mechanism 721 may be configured to engage a motor to re-position a payload based on instructions received from the processor 730.

The UAV 100 may be of a helicopter design that utilizes one or more rotors 724 driven by corresponding motors 722 to provide lift-off (or take-off) as well as other aerial movements (e.g., forward progression, ascension, descending, lateral movements, tilting, rotating, etc.). The UAV 100 may utilize various motors 722 and corresponding rotors 724 for lifting off and providing aerial propulsion. For example, the UAV 100 may be a "quad-copter" that is equipped with four motors 722 and corresponding rotors 724. The motors 722 may be coupled to the processor 730 and thus may be configured to receive operating instructions or signals from the processor 730. For example, the motors 722 may be configured to increase rotation speed of their corresponding rotors 724, etc. based on instructions received from the processor 730. In some embodiments, the motors 722 may be independently controlled by the processor 730 such that some rotors 724 may be engaged at different speeds, using different amounts of power, and/or providing different levels of output for moving the UAV 100. For example, motors 722 on one side of the body 700 may be configured to cause their corresponding rotors 724 to spin at a higher rotations per minute (RPM) than rotors 724 on the opposite side of the body 700 in order to balance the UAV 100 burdened with an off-centered payload.

The body 700 may include a power source 712 that may be coupled to and configured to power the various other components of the UAV 100. For example, the power source 712 may be a rechargeable battery for providing power to operate the motors 722, the payload mechanism 721, and/or the units of the processor 730.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for utilizing an unmanned aerial vehicle (UAV) to monitor hazards for a user, the method comprising:
   maintaining the UAV at a monitoring position relative to the user;
   monitoring, by the UAV, an area surrounding the user for approaching objects;
   determining, by the UAV, whether a detected approaching object poses a danger to the user; and
   performing, by the UAV, one or more actions to mitigate the danger of the approaching object in response to determining that the approaching object poses the danger to the user, wherein performing the one or more actions comprises sending a warning to the approaching object that poses the danger to the user using device-to-device communication through a bi-directional wireless communication link.

2. The method of claim 1, wherein maintaining the UAV at the monitoring position relative to the user comprises:
   determining, by the UAV, one or more attributes of the user; and
   determining, by the UAV, the monitoring position based on the one or more attributes of the user.

3. The method of claim 2, wherein determining the one or more attributes of the user comprises determining at least one of a position, a velocity, or a height of the user.

4. The method of claim 2, further comprising:
   determining, by the UAV, one or more attributes of one or more additional people with the user,
   wherein determining the monitoring position is further based on the one or more attributes of the one or more additional people.

5. The method of claim 2, further comprising:
   determining, by the UAV, one or more environmental conditions;
   wherein determining the monitoring position is further based on the one or more environmental conditions.

6. The method of claim 5, wherein determining one or more environmental conditions comprises determining at least one of a height of one or more stationary objects surrounding the user, a lighting condition, a weather condition, or a current time.

7. The method of claim 1, wherein monitoring the area surrounding the user for approaching objects comprises:
   estimating, by the UAV, a travel path for the user;
   determining, by the UAV, an area to scan based on the estimated travel path for the user;
   scanning, by the UAV, the determined area to detect objects;
   estimating, by the UAV, a travel path for a detected object; and
   determining, by the UAV, whether the estimated travel path of the user intersects the estimated travel path of the detected object by at least a predetermined probability.

8. The method of claim 7, wherein:
   estimating the travel path of the user comprises estimating the travel path of the user based on at least a position and a velocity of the user; and
   estimating the travel path of the detected object comprises estimating the travel path of the detected object based on at least a position and a velocity of the detected object.

9. The method of claim 7, wherein the predetermined probability is specified by the user.

10. The method of claim 7, wherein the estimated travel path of the user and the estimated travel path of the detected object are estimated over a specified time frame.

11. The method of claim 7, wherein determining the area to scan comprises determining an area within a distance from all points of the estimated travel path of the user.

12. The method of claim 11, wherein the distance is specified by the user.

13. The method of claim 7, wherein determining the area to scan further comprises determining at least one of a specified radius surrounding the user and an area within a distance from all points of a prior travel path of the user.

14. The method of claim 7, further comprising determining a probability of accuracy of each of the estimated travel path of the user and the estimated travel path of the detected object.

15. The method of claim 7, wherein scanning the determined area to detect objects comprises communicating with one or more objects through device-to-device or cellular communications.

16. The method of claim 1, wherein determining whether the approaching object poses the danger to the user comprises:
   determining, by the UAV, one or more attributes for the approaching object;
   comparing, by the UAV, the one or more attributes to one or more thresholds;

determining, by the UAV, whether the one or more attributes of the approaching object exceeds at least one of the one or more thresholds; and determining, by the UAV, that the approaching object poses the danger to the user in response to determining that the one or more attributes of the approaching object exceeds at least one of the one or more thresholds.

17. The method of claim 16, wherein the one or more attributes comprises one or more of a position of the approaching object, a velocity of the approaching object, a size of the approaching object, a type of the approaching object and a hazardous characteristic of the approaching object.

18. The method of claim 16, wherein the one or more thresholds are specified by the user.

19. The method of claim 16, wherein the one or more attributes are obtained through device-to-device or cellular communications with the approaching object.

20. The method of claim 1, wherein performing the one or more actions further comprises at least one of generating a visual warning, sounding an audio warning, sending a warning to a wireless communication device carried by the user, escorting the user past the danger, blocking a travel path of the user, or blocking a travel path of the approaching object.

21. The method of claim 1, further comprising:
determining, by the UAV, whether the approaching object still poses the danger to the user; and
continuing, by the UAV, the one or more actions in response to determining that the approaching object still poses the danger to the user.

22. The method of claim 21, wherein determining whether the approaching object still poses the danger to the user comprises at least one of:
estimating, by the UAV, a travel path of the user and a travel path of the approaching object; and
comparing, by the UAV, one or more attributes of the approaching object to one or more thresholds.

23. An unmanned aerial vehicle (UAV), comprising:
a processor configured with processor-executable instructions to:
maintain the UAV at a monitoring position relative to a user;
monitor an area surrounding the user for approaching objects;
determine whether a detected approaching object poses a danger to the user; and
perform one or more actions to mitigate the danger of the approaching object in response to determining that the approaching object poses the danger to the user, wherein performing the one or more actions comprises sending a warning to the approaching object that poses the danger to the user using device-to-device communication through a bi-directional wireless communication link.

24. The UAV of claim 23, wherein the processor is further configured with processor-executable instructions to maintain the UAV at the monitoring position relative to the user by:
determining one or more attributes of the user; and
determining the monitoring position based on the one or more attributes of the user.

25. The UAV of claim 24, wherein the processor is further configured with processor-executable instructions to determine one or more attributes of the user comprising at least one of a position, a velocity, or a height of the user.

26. The UAV of claim 24, wherein the processor is further configured with processor-executable instructions to:
determine one or more attributes of one or more additional people with the user,
wherein determining the monitoring position is further based on the one or more attributes of the one or more additional people.

27. The UAV of claim 24, wherein the processor is further configured with processor-executable instructions to:
determine one or more environmental conditions;
wherein determining the monitoring position is further based on the one or more environmental conditions.

28. The UAV of claim 27, wherein the processor is further configured with processor-executable instructions to determine one or more environmental conditions comprising at least one of a height of one or more stationary objects surrounding the user, a lighting condition, a weather condition, or a current time.

29. The UAV of claim 23, wherein the processor is further configured with processor-executable instructions to monitor the area surrounding the user for approaching objects by:
estimating a travel path for the user;
determining an area to scan based on the estimated travel path for the user;
scanning the determined area to detect objects;
estimating a travel path for a detected object; and
determining whether the estimated travel path of the user intersects the estimated travel path of the detected object by at least a predetermined probability.

30. The UAV of claim 29, wherein the processor is further configured with processor-executable instructions to:
estimate the travel path of the user based on at least a position and a velocity of the user; and
estimate the travel path of the detected object based on at least a position and a velocity of the detected object.

31. The UAV of claim 29, wherein the processor is further configured with processor-executable instructions to estimate the travel path of the user and estimate the travel path of the detected object over a specified time frame.

32. The UAV of claim 29, wherein the processor is further configured with processor-executable instructions to determine the area to scan including an area within a distance from all points of the estimated travel path of the user.

33. The UAV of claim 29, wherein the processor is further configured with processor-executable instructions to determine the area to scan including at least one of a specified radius surrounding the user and an area within a distance from all points of a prior travel path of the user.

34. The UAV of claim 29, wherein the processor is further configured with processor-executable instructions to scan the determined area to detect objects by communicating with one or more objects through device-to-device or cellular communications.

35. The UAV of claim 23, wherein the processor is further configured with processor-executable instructions to determine whether the approaching object poses the danger to the user by:
determining one or more attributes for the approaching object;
comparing the one or more attributes to one or more thresholds;
determining whether the one or more attributes of the approaching object exceeds at least one of the one or more thresholds; and
determining that the approaching object poses the danger to the user in response to determining that the one or more attributes of the approaching object exceeds at least one of the one or more thresholds.

36. The UAV of claim 35, wherein the one or more attributes comprises one or more of a position of the approaching object, a velocity of the approaching object, a size of the approaching object, a type of the approaching object or a hazardous characteristic of the approaching object.

37. The UAV of claim 23, wherein the one or more actions further comprise at least one of generating a visual warning, sounding an audio warning, sending a warning to a wireless communication device carried by the user, escorting the user past the danger, blocking a travel path of the user, or blocking a travel path of the approaching object.

38. The UAV of claim 23, wherein the processor is further configured with processor-executable instructions to:
   determine whether the approaching object still poses the danger to the user; and
   continue the one or more actions in response to determining that the approaching object still poses the danger to the user.

39. The UAV of claim 38, wherein the processor is further configured with processor-executable instructions to determine whether the approaching object still poses the danger to the user comprises at least one of:
   estimating a travel path of the user and a travel path of the approaching object; and
   comparing one or more attributes of the approaching object to one or more thresholds.

40. A non-transitory computer readable storage medium having stored thereon processor-executable software instructions configured to cause a processor of an unmanned aerial vehicle (UAV) to perform operations comprising:
   maintaining the UAV at a monitoring position relative to a user;
   monitoring an area surrounding the user for approaching objects;
   determining whether a detected approaching object poses a danger to the user; and
   performing one or more actions to mitigate the danger of the approaching object in response to determining that the approaching object poses the danger to the user, wherein performing the one or more actions comprises sending a warning to the approaching object that poses the danger to the user using device-to-device communication through a bi-directional wireless communication link.

41. An unmanned aerial vehicle (UAV), comprising:
   means for maintaining the UAV at a monitoring position relative to a user;
   means for monitoring an area surrounding the user for approaching objects;
   means for determining whether a detected approaching object poses a danger to the user; and
   means for performing one or more actions to mitigate the danger of the approaching object in response to determining that the approaching object poses the danger to the user, wherein performing the one or more actions comprises means for sending a warning to the approaching object that poses the danger to the user using device-to-device communication using means for linking bi-directional wireless communication.

* * * * *